US011373254B2

(12) United States Patent
Tapia et al.

(10) Patent No.: US 11,373,254 B2
(45) Date of Patent: Jun. 28, 2022

(54) SYSTEMS AND METHODS OF UTILITY MANAGEMENT

(71) Applicant: TUPL, Inc., Snoqualmie, WA (US)

(72) Inventors: Pablo Tapia, Snoqualmie, WA (US); Rafael Sanchez Mejias, Dallas, TX (US); Juan Jose Escobar, Málaga (ES)

(73) Assignee: TUPL, Inc., Bellevue, WA (US)

( * ) Notice: Subject to any disclaimer, the term of this patent is extended or adjusted under 35 U.S.C. 154(b) by 1168 days.

(21) Appl. No.: 15/622,036

(22) Filed: Jun. 13, 2017

(65) Prior Publication Data

US 2018/0130145 A1 May 10, 2018

Related U.S. Application Data

(60) Provisional application No. 62/350,112, filed on Jun. 14, 2016.

(51) Int. Cl.
| G06Q 10/06 | (2012.01) |
| G06Q 50/06 | (2012.01) |
| G06N 20/00 | (2019.01) |
| G06Q 30/00 | (2012.01) |

(52) U.S. Cl.
CPC ............ *G06Q 50/06* (2013.01); *G06N 20/00* (2019.01); *G06Q 10/06395* (2013.01); *G06Q 30/018* (2013.01)

(58) Field of Classification Search
None
See application file for complete search history.

(56) References Cited

U.S. PATENT DOCUMENTS

| 6,795,935 B1* | 9/2004 | Unkle ................ G05B 23/0275 340/438 |
| 2007/0130093 A1* | 6/2007 | Haji-Valizadeh ...... G06Q 50/06 705/413 |
| 2010/0114385 A1* | 5/2010 | Dempster ................ F24F 11/62 700/276 |
| 2011/0178977 A1* | 7/2011 | Drees ..................... G06Q 10/06 706/52 |

(Continued)

FOREIGN PATENT DOCUMENTS

WO    WO-2017127373 A1 *  7/2017  ............. G05B 15/02

OTHER PUBLICATIONS

Gary "Effective Data Management Enables Intelligent Utility Management", 2014, City University of New York (CUNY) CUNY Academic Works, pp. 1-8 (Year: 2014).*

*Primary Examiner* — Romain Jeanty

(57) ABSTRACT

A method and system of managing a utility system having a plurality of subsystems. A utility management server receives performance measurement data of a subsystem of a first utility system is received, from a first utility monitoring device (UMD). A type of the subsystem and a type of the first UMD is determined. Static rules are applied based on the type of subsystem and the type of UMD. Upon determining that the predetermined condition based on the static rules is not met, identifying a subsystem and its corresponding UMD responsible for a malfunction by retrieving contextual information from the measurements megastore server, analyzing the data from the first UMD and the contextual information, and sending a notification to the UMD having the subsystem that has been identified as being the source of the malfunction.

20 Claims, 6 Drawing Sheets

(56) References Cited

U.S. PATENT DOCUMENTS

| | | | | |
|---|---|---|---|---|
| 2012/0185728 A1* | 7/2012 | Guo | ................. | F24F 11/30 |
| | | | | 714/26 |
| 2013/0187788 A1* | 7/2013 | Salter | ................. | G08C 19/16 |
| | | | | 340/870.02 |
| 2014/0316743 A1* | 10/2014 | Drees | ................. | G05B 23/00 |
| | | | | 702/184 |
| 2016/0011618 A1* | 1/2016 | Janous | ................. | G05B 15/02 |
| | | | | 700/291 |
| 2016/0077507 A1* | 3/2016 | Sheble | ................. | G06Q 10/06 |
| | | | | 700/295 |
| 2016/0203036 A1* | 7/2016 | Mezic | ................. | G06N 20/00 |
| | | | | 714/819 |
| 2016/0258648 A1* | 9/2016 | Liu | ................. | F24F 3/1405 |
| 2016/0357177 A1* | 12/2016 | Chand | ................. | G06F 21/6218 |
| 2017/0011298 A1* | 1/2017 | Pal | ................. | H04L 67/12 |
| 2017/0104774 A1* | 4/2017 | Vasseur | ................. | G06N 20/00 |
| 2017/0212482 A1* | 7/2017 | Boettcher | ................. | H02J 13/00004 |

\* cited by examiner

SYSTEMS AND METHODS OF UTILITY MANAGEMENT

CROSS REFERENCE TO RELATED PATENT APPLICATION

This application claims priority to U.S. Provisional Patent Application No. 62/350,112, filed on Jun. 14, 2016, entitled "Systems and Methods of Utility Management," which is hereby incorporated by reference in its entirety.

BACKGROUND

In recent years, there has been an increase in interest to conserve natural resources and to reduce the overall carbon footprint. To that end, utilities, such as water, natural gas, and electric, are constantly striving to improve their efficiency and reduce waste. One way of advancing an efficient utility system is to maintain an overall healthy operation of all subsystems thereof. Today's advanced utility systems include a substantial number of data sources. A volume of performance data is collected from each subsystem of a complex utility system, which is often aggregated in time intervals such as minutes, hours, days, etc. Together, the data allows key performance indicators (KPIs) to be extracted, which may be reviewed by engineers to better understand the overall health of the utility system, detect problematic situations, and decide when it is time to take active measures, such as shutting off flow to a subsystem that is suspected of having a leak, opening a valve that is determined to be under high pressure.

Thus, each utility system typically includes various disparate utility metering devices (UMDs) that each measure a parameter of a subsystem of an overall complex utility system. For example, if a temperature of a subsystem is too high, an alarm may be generated such that an appropriately skilled engineer can review the situation to cure the malfunction. Similarly, if a humidity of another subsystem is too high, this may generate a separate alarm and/or may trigger a window to be opened to release the moisture.

One challenge in existing utility systems is that it is difficult to aggregate data from subsystems, particularly if they are of different type. For example, a measurement from a sensor related to temperature is not easy to combine with the flow rate through a pipe. Such specialized report requires significant processing and therefore may not be immediately available to the engineer. Once the data is made available, the engineer must still manually analyze the large volume of data, which is not only inefficient but may also be incomplete because an engineer may not be able to effectively discern trends from multiple subsystem.

Accordingly, while utility monitoring systems exist, the solution is typically based on locally obtained sensor data of a subsystem and not the utility system as a whole, let alone other similar utility systems. For example, a water plant that also performs desalination, may not consult the salinity of a first filtration stage when determining why the output pressure of a valve in a different subsystem is low, even though they may be indirectly (or directly) related. Put differently, present utility monitoring systems generally do not use information from sensors of other disparate subsystems in order to automatically control the operation of a local subsystem. Further, present utility systems do not have an automatic learning capability that spans across subsystems or even systems. The result is typically a sub-optimal performance of a utility plant, resulting in lost opportunities in conserving natural resources. It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

This disclosure generally relates to methods and systems of managing a utility. A scalable network backend is provided based on an open architecture that provides simplified access to data and increases automation. The operational efficiency and the overall cost of operation of the utility system is reduced by automation of functions. The use of big data technologies, complemented with machine learning approaches (including cognitive networks involving multiple neural networks), simplify and automate complex tasks, resulting in a more efficient utility operation, improved customer quality, and reduced customer churn.

In one aspect, the systems described herein provide an open platform where multiple data feeds from various utility subsystems are combined and processed in real time. In one embodiment, the system performs continuous monitoring and transmission of the monitored data from each network node, which can be synthesized at a remote server. The synthesized data harvested from various subsystems and stored contextual information is analyzed for potential malfunctions and relevant solutions are provided. In one aspect, a notification is sent to a monitoring device of a utility subsystem to automatically cure the malfunction.

Example System Architecture

Figure 1:
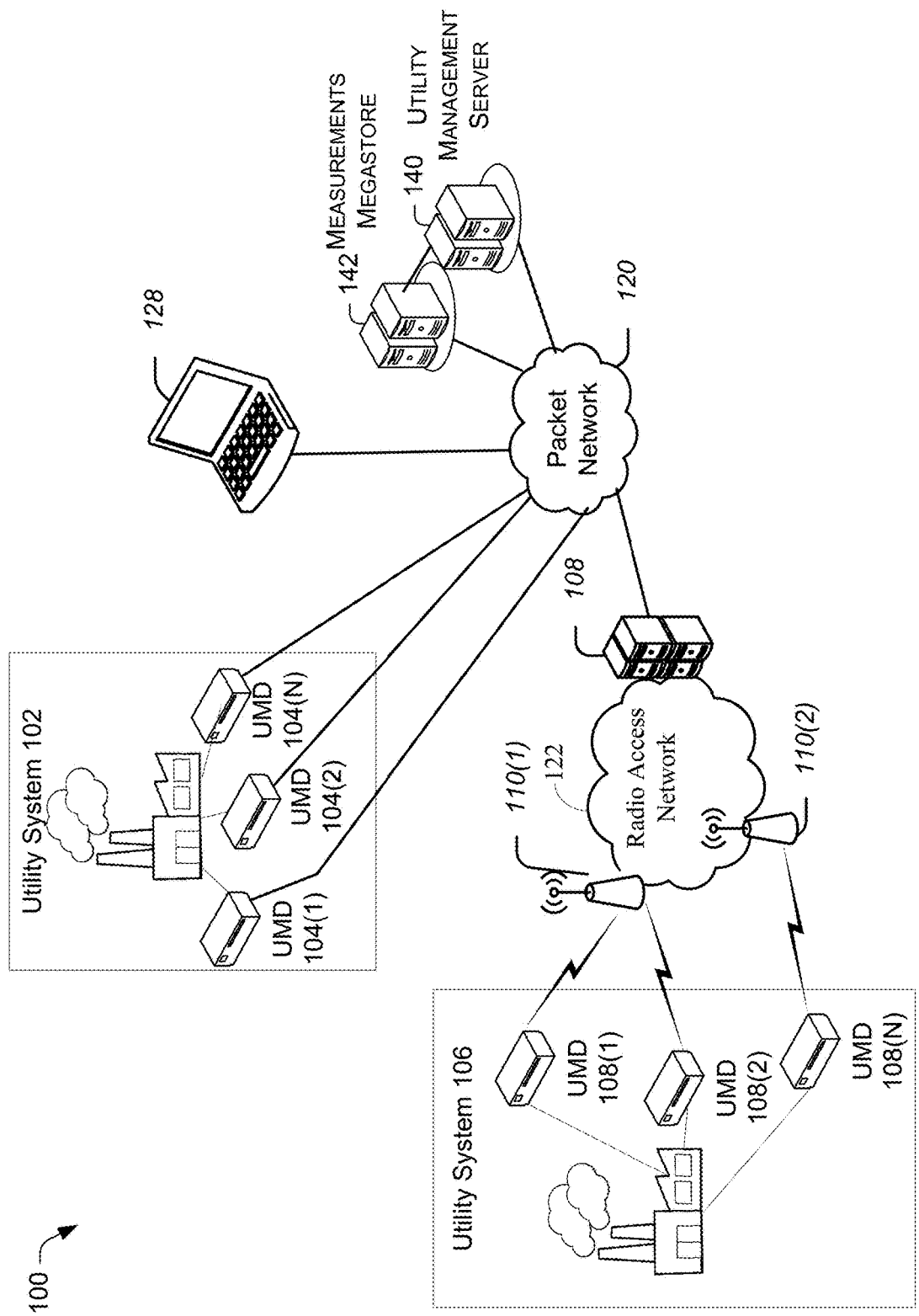
FIG. 1 illustrates an example architecture for implementing a system of managing a utility.

FIG. 1 illustrates an example architecture for implementing a system of managing a utility, such as water, electric power, coal, gas, oil, etc. Monitoring system 100 includes one or more utility systems 102, 106. Each utility system 102, 106, includes one or more utility measurement devices (UMD's) 104(1) to 104(N) and 108(1) to 108(N), respectively, which are configured to measure a performance and/or adjust one or more parameters of a subsystem. In various embodiments, depending on the type of utility system (e.g., water plant, electric power plant, etc.) and the particular subsystem thereof (e.g., desalination, pressure control, etc.), these UMD's may monitor a variety of status information, such as moisture, humidity, pressure, flow temperature, vibration, movement, voltage, current, sound, viscosity, salinity, alkalinity, per hydrogen (pH), general hardness (gH), carbohydrate hardness (kH), radioactivity, etc. Thus, each UMD may be disparate (e.g., be of different type and/or configured differently) to better accommodate the type of measurement the UMD is responsible for. In some embodiments, the UMD not only measures data of a subsystem, but also provides adjustment of parameters thereof.

In various embodiments, the performance measurement data acquired by the disparate UMD's is sent to a utility management server 140 either wirelessly through a wireless communication network or by wire (e.g., via a telephone communications cable, Ethernet, other cable, etc.). In this regard, FIG. 1 illustrates, by way of example, a Radio Access Network (RAN) 122 that may be accessed via one or more towers, sometimes referred to as base stations (e.g., 110(1), 110(2)). Such base stations may include a base transceiver system (BTS) that communicates via an antennae system at the site of the UMD and over the air-link with one or more of the UMD's that are within their range. Each base station 110(1), 110(2) may include a BTS coupled to several antennae mounted on a radio tower within a coverage area often referred to as a "cell." The BTS is the part of the radio network that sends and receives RF signals to/from the UMD's (e.g., 108(1) to 108(N)) that the base station 110(1), 110(2), currently serves, respectively.

In the example of FIG. 1, the radio access network 122 connects to a packet switched data communication network, such as the network commonly referred to as the "Internet" (i.e., public) and/or "Intranet" (i.e., private), shown by way of example at 120, via gateway 108. In various embodiments, each UMD can access the utility management server 140 and/or the measurements megastore 142 through the radio access network via the packet network 120, or directly through the packet network 120.

In various embodiments, each UMD is configured to send data to the utility management server 140 and receive notifications therefrom. Accordingly, each UMD 104(1) to 104(N) and 108(1) to 108(N) provides continuous monitoring at predetermined intervals (and/or upon request from the utility management server 140) to the utility management server 140. Thus, an UMD not only collects performance data at predetermined intervals, but also provides real-time data access capability to the utility management server 140.

The data sent from an UMD (e.g., 104(1)) may include measurement data related to a performance status (e.g., flow level, temperature, pressure, humidity, etc.) of a subsystem of a utility system 102 and identification information of the UMD and its corresponding subsystem (i.e., in order to differentiate one UMD/subsystem combination from another). In one embodiment, each UMD can receive notifications from the utility management server 140 to optimize the control features over its corresponding subsystem. To that end, each UMD may include one or more actuators that can adjust the performance of their corresponding subsystem. For example, UMD (e.g. 104(1)) may be configured to measure the pressure of a fluid flowing through a pipe (e.g., its corresponding subsystem). It may send the water pressure data at predetermined intervals (e.g., every 5 minutes, every hour, etc.) to the utility management server 140. Upon determining that there is a pipe rupture, the utility management server 140 may send a notification to the UMD 104(1), wherein the notification includes instructions to shut a valve to prevent fluid waste.

In one embodiment, monitoring system 100 includes a measurements megastore server 142, which is coupled for communication via the packet network 120. The measurements megastore server 142 stores contextual information, which includes information related to the measurement itself, based at least in part on the data received from the UMD's from one or more utility systems 102, 106. Contextual information includes any data that can cause the measurement to be ordered or clustered, such as time, location, and/or an identifier for the situation triggering the measurement. Examples of contextual information are provided later. In one embodiment, the measurements megastore server 142 may store information from data sources, some of which are accessible over the WEB/Internet, that is relevant to maintaining an efficient utility system such as weather and event information (e.g., construction that may be drawing more utility resources). Other data sources may include information within the utility, such as customer data, and usage data.

The information from the measurements megastore 142 can be used by the utility management server 140 to determine key performance indicators (KPIs) of the UMD's to provide notifications and/or tailored optimization of the subsystem thereof. Accordingly, the utility management server 140 is configured to receive subsystem performance measurement data from UMD's (e.g., 104(1) to 104(N) and 108(1) and 108(N)) and analyze the received data in view of the contextual information provided by the measurements megastore 142. It is to be appreciated that the measurements megastore 142 includes information from the entire system 100, which may include many (e.g., millions) of UMD'S associated with one or more utility systems 102, 106.

Accordingly, the utility management server 140 is configured to analyze the subsystem performance measurement data received from each UMD together with the contextual information from other UMD's. Based on this analysis, the utility management server 140 determines whether one or more predetermined conditions are met, thereby determining whether the subsystem associated with a particular UMD is functioning properly. If a malfunction is detected, the contextual information may be used to determine whether other subsystems in the industrial path of the utility (e.g., 102) may be responsible for the malfunction of a subject subsystem.

In various embodiments, the utility management server 140 may retrieve contextual information from the measurements megastore 142, wherein the contextual information includes at least one of the following: (i) historical information of the UMD of the subject subsystem, (ii) one or more subsystems connected before the UMD of the subject subsystem, (iii) and one or more subsystems connected after the UMD of the subject subsystem.

For example, if UMD 104(1) is deemed to be not functioning properly based on the analysis performed on the subsystem performance measurement data received by the utility management server 140 from the UMD 104(2), the utility management server 140 may perform additional analysis to determine whether UMD 104(2) is truly at fault or another subsystem before it (e.g., 104(1)) and/or another subsystem after it (e.g., 104(N)) is/are the actual or contributing sources of the malfunction or degraded performance. To that end, in various embodiments, the utility management server 140 may analyze the present and/or historic performance data of the subsystems associated with UMD 104(1) and 104(N) in addition to the performance of UMD 104(2), provided by the measurements megastore 142.

In various embodiments, the subsystem performance measurement data may use the latest data stored thereof in the measurements megastore 142 and/or historic data to determine trends and extrapolate therefrom. For example, UMD 104(2) may indicate a pressure reading that is within an acceptable range, albeit at the high end. Contextual information from the measurements megastore for UMD 104(2) may indicate a steady increase (e.g., linear or on a log scale) in pressure. Contextual information from the measurements megastore 142 further indicates that one or more subsystems before and after UMD 104(2) are functioning properly. In various embodiments, this determination may be based on present measurements of the respective UMD's or historical trends thereof.

Upon determining that the source of the malfunction is the subsystem of UMD 104(2) itself, a notification may be sent to UMD 104(2), which may include instructions operative to perform automatic corrective action (e.g., adjustment of a valve through an actuator). Accordingly, in contrast to prior art utility monitoring systems that monitor each subsystem individually and mutually exclusively from other subsystems, the system described herein has the benefit of not only identifying whether a local subsystem is malfunctioning, but also identifying the true source of the malfunction and possibly also automatically curing the malfunction. For example, the utility management server 140 may determine that another subsystem that is in the industrial path of the subject subsystem is the source of the malfunction.

Further, if a malfunction is deemed by the utility management server to affect a another similar subsystem coupled to a different UMD, action may be taken with regard to the similar subsystem to proactively and automatically cure the malfunction via one or more notifications from the utility management server. For example, if the subsystem monitored by UMD 104(1) is of the same type as UMD 108(1) (e.g., both are similar desalination elements of a water treatment plant), then the learning that is performed with respect to UMD 108(1) may be applied to the subsystem of UMD 108(1). Put differently, if the utility management server 140 learns, based on the subsystem performance measurement data from UMD 104(1) and the relevant contextual information from the measurements megastore 142, that a threshold pressure measured by UMD 104(1) led to a failure of the subsystem monitored by UMD 104(1), then the utility management server 140 may send a notification to UMD 108(1) prior to the threshold pressure being measured by UMD 108(1) to prevent the malfunction of the subsystem of UMD 108(1).

Accordingly, in one aspect, the monitoring system 100 described herein allows the sharing of information from multiple utility systems and subsystems, which not only improves the probability of successfully identifying one or more sources of a malfunction, but also allows applying the learning obtained with respect to one subsystem to other similar subsystems.

In one embodiment, the utility management server 140 provides an automated utility report to one or more appropriate recipients to provide a status information on a utility system and/or to comply with regulatory requirements. To that end, automated reports can be generated at predetermined intervals (e.g., daily, monthly, etc.), when a threshold condition is met (e.g., emergency), and/or upon request from an authorized entity, such as a local municipality, state government, emergency management department, utility plant manager, utility engineer, etc. This report is based on the latest subsystem performance measurement data harvested from the various UMD's of a utility system (e.g., 102) as well as the contextual information from the measurements megastore 142, to provide a graphical and tabular summary of the performance of a utility system. In one embodiment, the report provides comparisons to appropriate benchmarks, such as performance averages for other time periods and/or other utility system(s) of similar type, and provide forecasts based on the contextual information from the measurements megastore 142. In various embodiments, different reports may be generated for different recipients. For example, compliance reports for government entities may be filtered for simplicity, whereas reports to the utility engineers may be more detailed in that they include identified anomalies based on (i) presently malfunctioning equipment, (ii) equipment that is estimated to soon malfunction (e.g., within a predetermined time period), (iii) and areas of improvement based on comparisons of efficiency metrics with other utility systems of similar type (e.g., both being water plants).

In various embodiments, this reporting feature of the utility management server 140 may be part of or may be mutually exclusive from the notification provided by the utility management server 140 discussed above. For example, in one embodiment, the notification includes instructions for automatic corrective action to the appropriate UMD, whereas a report does not include automatic instructions but provides a visual interface of a summary of the status of a utility system.

In various embodiments, the report may be pushed to the appropriate recipient via e-mail, telephone, text, social media, etc., such that it can be read on their electronic device, represented by way of example by computer 128. In one embodiment, reports can be "pulled" from the utility management server 140 via the packet network 120 and/or the radio access network 122.

A "push" communication is one in which the utility management server 140 initiates the communication session and transmission of the report to the client (e.g., to an appropriate recipient that can receive the report via a computing device, such as PC 128). In one embodiment, there may be a "quasi-push," wherein the computing device 128 sends a request to the utility management server 140 to "pull" desired data down from the measurements megastore 142 to the computing device 128. With such an approach, if a utility management server 140 wants to send a notification and/or a report to an appropriate recipient, the utility management server 140 waits for the computing device 128 to establish a data communication connection with the utility management server 140.

In contrast, with "pull" communication, the request for the transmission of information is initiated by the client (e.g., computing device 128). For example, an application on the computing device 128 contacts the utility management server 140 to receive a report therefrom.

The utility management server 140 and the measurements megastore 142 may be implemented in a distributed fashion on a number of similar platforms, to distribute the processing load and/or to provide additional functionality. In this regard, the system 100 provides an open platform where multiple data feeds from various UMD'S, which may be of disparate type, can be combined and processed in real time, for millions of UMD's. Thus, the functionality described herein with respect to each of the servers 140 and 142 can also be provided by one or multiple different servers. The actual operation of the system 100 is described by way of example later.

Example Utility Monitoring Device

Figure 2:
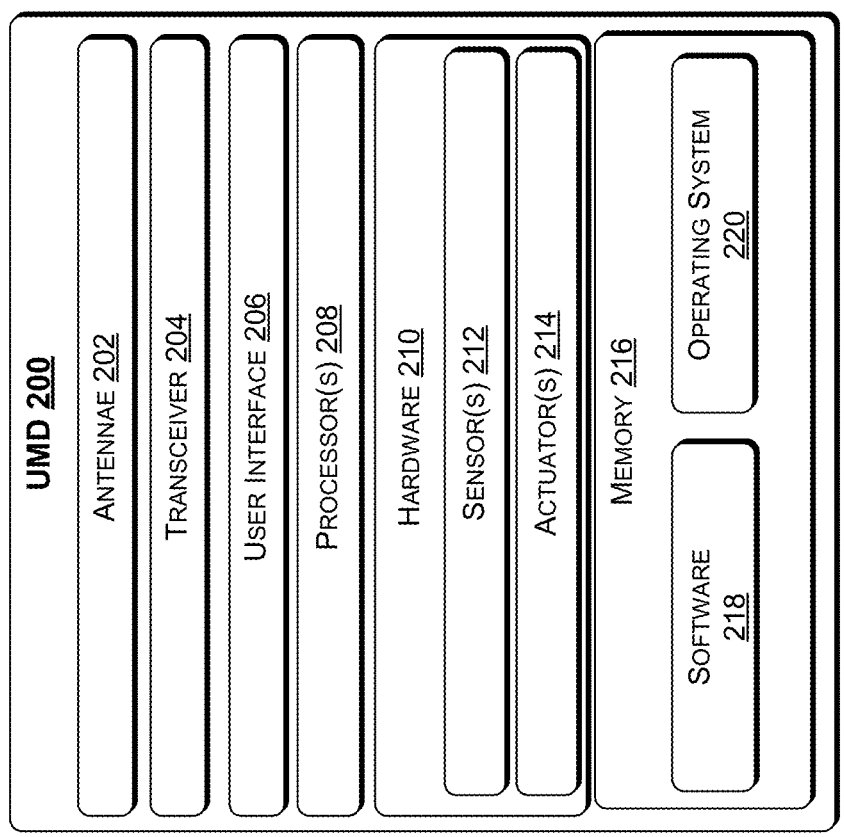
FIG. 2 is an example high level block diagram of a utility measurement device.

FIG. 2 is a block diagram showing various components of an illustrative UMD 200 that is configured to measure a status of a subsystem of a utility system, send subsystem performance measurement data to the utility management server 140 and receive notifications therefrom. The UMD 200 may include one or more antennae 202, transceiver 204, user interface 206, one or more processors 208, hardware 210, one or more sensors 212, one or more actuators 214, and memory 216.

In some embodiments, the antennae 202 include an uplink antenna that sends radio signals to a radio tower (e.g., 110(1) in FIG. 1), and a downlink antenna that receives radio signals from the radio tower. In other embodiments, a single antenna may both send and receive radio signals. These signals may be processed by a transceiver 204 that is configured to receive and transmit data. In one embodiment, the UMD 200 may not have an antenna 202. Instead, communication is provided via a wire directly through the transceiver 204.

In one embodiment, the UMD includes a user interface 206 that enables a user to provide input and receive output from the UMD 200. For example, the user interface 206 may include a data output device (e.g., visual display, audio speakers, haptic device, etc.) to communicate a malfunction that has been identified by the utility management server 140. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces.

The UMD 200 may include one or more processors 208, which may be a single-core processor, a multi-core processor, a complex instruction set computing (CISC) processor, or another type of processor. The hardware 210 may include a power source and digital signal processors (DSPs), which may include single-core or multiple-core processors. The processors may perform operation in parallel to process a continuous stream of data that may be provided by a subsystem of a utility system.

The hardware 210 may also include network processors that manage high speed communication interfaces, including communication interfaces that interact with peripheral components. The network processors and the peripheral components may be linked by switching fabric. The hardware 210 may further include hardware decoders and encoders, a network interface controller, and/or a universal serial bus (USB) controller.

The network interface controller may enable the processors to transmit and receive data via the wired or a wireless computer network connection of FIG. 1. In some embodiments, the hardware 210 may also include a direct memory access (DMA) engine. The DMA engine may enable the various controllers to access the memory 216 independently of the one or more processors 208 to perform tasks. The various controllers and processors of the UMD 200 may execute instructions and perform tasks under the direction of software components that are stored in the memory 216.

The hardware 210 of the UMD 200 may include one or more sensors 212 that are configured to measure a performance of the subsystem of a utility system. In various embodiments, the one or more sensors may monitor at least one of: moisture, humidity, pressure, flow temperature, vibration, movement, voltage, current, sound, viscosity, salinity, alkalinity, per hydrogen (pH), general hardness (gH), carbohydrate hardness (kH), radioactivity, count a number of cycles, etc. The data harvested by the sensor(s) 212 is sent by the transceiver 204 to the utility management server 140.

In one embodiment, the hardware 210 of the UMD 200 includes one or more actuators that are configured to adjust an operation of a subsystem. An actuator is a motor that is responsible for moving or controlling a mechanism of the subsystem. For example, upon receiving a notification from the utility management server 140, the one or more processors 208 may extract the instructions from the notification and direct the one or more actuators 214 to automatically perform the requested adjustment of one or more parameters of the subsystem. Alternatively or in addition, one or more parameters of the subsystem may be adjusted electronically (e.g., without a mechanical actuator).

Returning back to the memory 216, such memory may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components that are executable or accessible by the processors 208 and controllers of the UMD 200. The various components may include software 218 and an operating system 220. Each module may include routines, program instructions, objects, and/or data structures that perform particular tasks or implement particular abstract data types.

The software 218 may enable the UMD 200 to perform functions and control hardware components, including the actuators 214, of the UMD 200. In various embodiments, the software 218 may include algorithms that support the sending of subsystem performance measurement data to the utility management server 140 and to receive notifications therefrom.

The operating system 220 may include components that enable the UMD 200 to receive and transmit data via various interfaces (e.g., user interface 206, communication interfaces, etc.). The operating system 220 may also process data using the one or more processors 208 to generate outputs based on inputs that are received via the user interface 206. For example, the operating system 220 may provide an execution environment for the execution of the software 218 and other software applications. Additionally, the operating system 220 may include other components that perform various other functions generally associated with an operating system.

Example Data Framework of a Utility Management System

Figure 3:
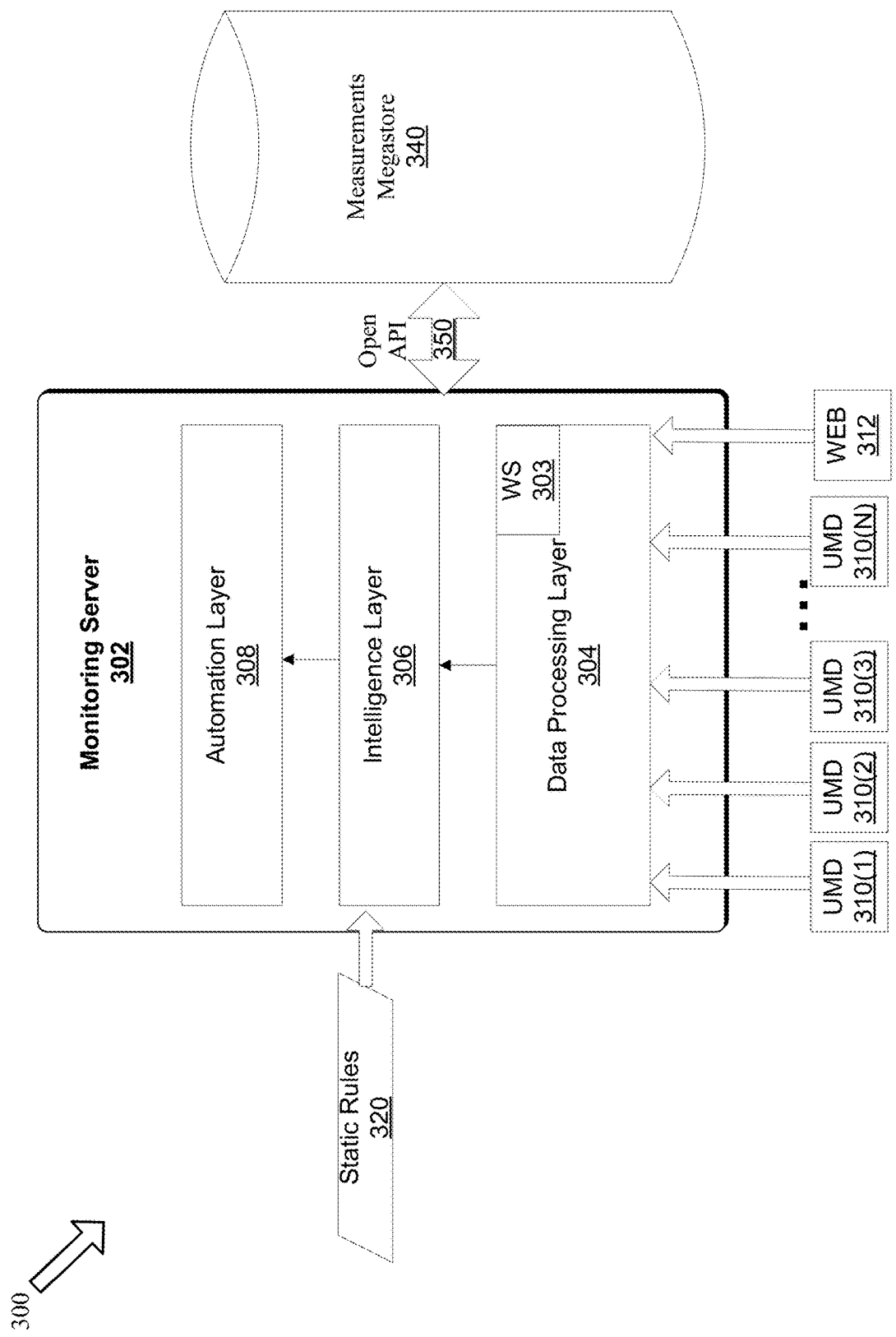
FIG. 3 is an example high level block diagram of a data framework of a utility management system.

Reference now is made to FIG. 3, which is a block diagram of a data framework of a utility management system 300, consistent with an exemplary embodiment. System 300 includes a utility management server 302 that is coupled to a measurements megastore 340 via an open Application Program Interface (API) 350. The utility management server 302 may have a data framework that includes a data processing layer 304, an intelligence layer 306, and an automation layer 308.

In one embodiment, the data framework in system 300 uses massive parallel processing methods to gather data from a plurality of (e.g., disparate) UMD'S 310(1) to 310(N). To facilitate the present discussion, the data processing layer 304, the intelligence layer 306, and the automation layer 308 are illustrated as being separate from the measurements megastore 340, while it will be understood that, in various embodiments, these functions may be combined on a single platform (i.e., a single utility management server 302 that includes the functions of the measurements megastore 340.) In one embodiment, to accommodate the real-time and large volume of data that is being generated by many (e.g., millions) UMD's, the measurements megastore 340 uses a massive parallel processing technology such as Hadoop, Storm, or Spark.

The data processing layer 304 is configured to receive data from many UMD's 310(1) to 310(N). The type of data received by the data processing layer 304 is based on the type of UMD and the type of subsystem that the UMD monitors. In various embodiments, the data may relate to moisture, humidity, pressure, flow, temperature, vibration, movement, voltage, current, sound, viscosity, salinity, alkalinity, per hydrogen (pH), general hardness (gH), carbohydrate hardness (kH), radioactivity, count of a number of cycles, etc. In addition, identification information of the UMD and its corresponding utility system, such as an identification number, operating system, and software version may be included.

In one embodiment, the data processing layer 304 of the processing server 302 may also receive information from the WEB 312 that is relevant to maintaining an efficient utility system, such as weather and event information. The data gathering of the data processing layer 304 may be performed in real time and/or in batch. The monitoring may be performed continuously (e.g., 24 hours a day, 7 days a week), at predetermined intervals, and/or in response to a trigger from the intelligence layer 306 of the monitoring system 300. To that end, the data processing layer may include a workflow scheduler (WS) 203 that checks for available data from the various UMD's 310(1) to 310(N) and stores the data in the measurements megastore 340. The WS may also control the data retention period of the raw information from the UMD stored in the measurements megastore 340 and what is to happen with the data when the retention period expires (e.g., delete the data, move it to a different location, etc.).

In one embodiment, the data processing layer 304 performs basic data integrity tests to verify that the content of the received node performance data is not corrupt before storing the data in the measurements megastore 340. Upon determining that the data is valid, the data processing layer can perform predefined calculations to extract various KPI's from the subsystem performance measurement data provided by each UMD. The KPI definitions may be configurable and incorporated to the utility management server 302 in the form of a configuration text file. The KPIs may be calculated and aggregated on different dimensions depending on the type of utility system (e.g., water treatment plant, gas plant, electric power plant, etc.). KPIs may also be calculated differently for peak and busy time periods, as well as predefined events (e.g., heavy rain storms that may affect the salinity readings, scheduled solar panel cleanings that may affect the power readings, etc.).

The intelligence layer 306 is configured to receive the information from the data processing layer 304 as well as static pattern detection rules 320 that may be preprogrammed in the intelligence layer 306. In addition, the intelligence layer may also develop complex rules based on the contextual information obtained by the measurements megastore 340. In one embodiment, the static rules 320 may be originally programmed by expert professionals, based on prior knowledge.

Static rules 320 may apply to the clustered measurements based on contextual data. For example, a cluster containing a large number of measurements that resulted in a malfunction being diagnosed and reported might suggest that another measurement in the cluster that did not result in a malfunction being diagnosed and reported being flagged for further analysis regarding the diagnoses and reporting of the other measurements in the cluster.

Static rules 320 may apply to measurements correlated with respect to outside data such as customer usage, weather and data not specific to a UMD.

In various embodiments, depending on the subsystem of the utility system monitored by the UMD, the intelligence layer 306 may use a different set of static rules. For example, static rules for a water treatment plant are different from those used for a gas power plant. Furthermore, there may be different static rules for each subsystem of a utility system. For example, a utility may be a water treatment plant comprising many subsystems that each include further subsystems, and so forth. One of the subsystems of a water treatment utility may be a desalination subsystem. The desalination subsystem may include further subsystems, such as pretreatment, pressurization, membrane separation, and post-treatment. Each of these subsystems of a subsystem, can further have their own-subsystems, such as valves, pipes, pH treatments, gH treatments, etc. The intelligence layer 306 may apply different static rules for different subsystems and at different levels of granularity of a subsystem.

For example, the intelligence layer may determine that a subsystem (e.g., a pipe carrying a fluid) of a utility plant is exhibiting a flow that is above a predetermined threshold over a predetermined time period (e.g., there is consistently more flow in the pipe in a 24 hour period than expected). Depending on the volume of fluid flow, this measurement may ultimately lead to an alert in the form of a notification indicating a leak or rupture of the pipe.

In addition, the intelligence layer 306 may retrieve contextual information from the measurements megastore 340, including historic data, to extract performance patterns and trends of the subsystem in question, as well as one or more subsystems before and/or after the subsystem in question in the industrial path of the utility system. In one embodiment, the contextual information from the measurements megastore 340 includes the performance data of one or more subsystems of another utility system. In various embodiments, the other utility system may be of the same type (e.g., both water treatment plants) or may be disparate (e.g., one is a water utility plant but not the other), as long as the type of subsystems are the same (e.g., same type of pipe serving a similar purpose).

The one or more alerts are later used by the automation layer 308 to create a notification to an appropriate recipient, which is discussed in more detail later.

In one embodiment, the intelligence layer 306 also develops complex rules based on contextual information provided by the measurements megastore 340. In this regard, the intelligence layer 306 may identify KPIs and possible causes of malfunctions when alerts occur. The intelligence layer 306 automatically extracts relevant information from various UMD's, which may be stored in the measurements megastore 340. For example, if the subsystem of UMD 310(2) is deemed to be malfunctioning because one or more threshold criteria are not met (e.g., humidity is above a predetermined threshold) based on the static rules 320, the intelligence layer 306 of the utility management server 302 may retrieve information related to the UMD 310(2) from the measurements megastore 340, which may include not only historic information from the UMD 310(2), but also other subsystems having the same hardware and/or software or other UMD's in the industrial path of the subsystem of UMD 310(2).

For example, if the subsystem of a UMD 310(2) is under scrutiny, the intelligence layer 306 may determine how other similar subsystems monitored by other UMD's (e.g., having the same hardware, software, purpose, etc.) are performing based on the contextual information provided by the measurements megastore 340. In addition, other nodes that are in the industrial path, such as the subsystems of UMD 310(1) and 310(3) may be evaluated to determine the true cause of the malfunction. This contextual information is provided by the measurements megastore 340 and is used by the intelligence layer 306 of the utility management server 302 to extract patterns and trends therefrom to determine the root cause of the malfunction. There are an unlimited number of patterns that the intelligence layer 306 may detect with the information provided by the measurements megastore 340 and the data harvested from each UMD by the data processing layer 304.

In contrast to prior art utility monitoring systems, where each subsystem is evaluated based on only locally obtained sensor data of the subsystem, and adjusted independently, the methods and systems described herein provide a holistic evaluation of the utility system by determining whether one or more subsystems in the industrial path are responsible for a malfunction and take corrective action not only on the subsystem in question, but other subsystems in the industrial path when appropriate. Furthermore, the learning that is achieved by the intelligence layer in determining the source of the malfunction of a subsystem may be applied to other subsystems of the utility system or even other utility systems. Such analysis and automatic adjustment of one or more subsystems is made possible by wealth of information offered by the contextual information provided by the measurements megastore 340. Thus, even though a node may not be meeting the static rules 320, the intelligence layer may still deem the subsystem not to be the root cause of the malfunction because another subsystem in the industrial path is not functioning properly and is therefore at least contributorily responsible.

In addition, there may be a self-learning feature of the intelligence layer 306 that is operative to detect abnormal conditions without previous knowledge of that malfunction. The intelligence layer 306 may create one or more complex rules that change threshold criteria of successful operation of a subsystem when a similar event is identified to have occurred, based on the contextual information provided by the measurements megastore 340.

For example, the intelligence layer 306 may identify that there is a ruptured pipe (e.g., malfunction of the subsystem of UMD 310(2)). Based on the contextual information, the intelligence layer 306 may further determine that the subsystem before it (e.g., subsystem of UMD 310(1)) has experienced a number temperature cycles (e.g., 1000), which has not yet been deemed to be a problem. The intelligence layer 306 may further determine that a threshold number of other subsystems similar to the subsystem of UMD 310(2) had also ruptured when their corresponding subsystem before in its industrial path had experienced a substantially similar number of temperature cycles.

Consequently, the intelligence layer 306 can calculate several conclusions. First, that the subsystem of UMD (1) is the source of the malfunction of the subsystem of UMD 310(2). Second, that subsystems similar to those of the one immediately before in the industrial path of UMD 310(2) should be limited to number of temperature cycles that is less than the number that led to the malfunction of the subsystem of UMD 310(2) in order to prevent similar malfunctions in other subsystems. To that end, alerts (e.g., notifications) may be generated when a threshold number of temperature cycles is reached in such subsystems that are immediately before in the industrial path of other subsystems, similar to the subsystem of UMD 310(2).

Regarding the complex rules, the intelligence layer 306 may include a probability tree that stores the probabilities of particular causes and/or events that may be the root cause of a malfunction, such as a rupture of a pipe. The implementation of a probability tree is described in further detail later with respect to FIG. 4.

Accordingly, the intelligence layer 306 constantly sifts through the data harvested by the data processing layer 304 from various UMD's and retrieves contextual information from the measurements megastore 340 to identify patterns and/or trends within the data provided by the various UMD's 310(1) to 310(N). In one embodiment, the intelligence layer 306 may include different intelligence models for different types of subsystems monitored by the UMD's. The intelligence layer 306 is configured to identify a probable cause of a malfunction as well as an estimation of accuracy (error) for the error detection. In one embodiment, the accuracy of the detection is based on the frequency of the occurrence of the malfunction.

Thus, the intelligence layer 306 may identify a malfunction based on static rules 320 (i.e., that may be different for different types of subsystems), as well as complex rules based on contextual information obtained from the measurements megastore 340.

The automation layer 308 may trigger an automatic response to an identified subsystem malfunction of a utility system without having to rely on prior human processing of the raw data harvested from each UMD by the data processing layer 304. In one embodiment, the appropriate action for an identified malfunction is pre-programmed by a utility system administrator at the intelligence layer based on static rules. Alternatively or in addition, the appropriate action is dynamically determined by the intelligence layer based on the contextual information provided by the measurements megastore 340.

In one embodiment, a notification may be sent by the automation layer 308 to the UMD that has been identified as being the source of the malfunction or prophylactically to one or more similar nodes (e.g., having the same hardware, software, being in a similar location, etc.) to prevent a similar malfunction. It is again emphasized that the source of a malfunction need not be the subsystem of a UMD that is providing measurement data that is deemed to be above predetermined thresholds (e.g., malfunctioning). Rather, it could be one or more subsystems in the industrial path of the subsystem in question.

Alternatively or in addition, the notification may be sent to an engineer of the utility who is responsible for the subsystem, via text message, e-mail, telephone, social media, etc. To that end, the notification may be in the form of a visual or audio alert that is provided on a user interface (e.g., display, asserted LED, speaker, haptic element, etc.) of the UMD and/or computing device (128 in FIG. 1) of the appropriate engineer of the utility. In addition or alternatively, the notification may include electronic instructions that trigger a UMD to automatically adjust one or more settings of its corresponding subsystem.

The corrective action provided by the automation layer 380 depends on the type of subsystem and the type of malfunction. For example, the corrective action may be a resetting of a subsystem, adjusting a temperature, adjusting a pressure, opening/closing a valve, redirecting a flow, etc.

In one example, where multiple subsystems suffer a substantially similar patterns that ultimately lead to a failure of a subsystem of a utility system, the automation layer 308 may automatically send a notification (with the corrective action) to all UMD's of corresponding subsystems to prevent the malfunction. Put differently upon determining that a group of other similar subsystems of a utility system having a similar platform (e.g., hardware, software, operating system, etc.) are meeting a predetermined condition or exceeding a predetermined threshold, a notification is sent to the UMD's of these subsystems as well, with the automatic corrective action included therein.

In one embodiment, the automation layer 308 may provide one or more reports, such as compliance reports for government entities) instead of or in addition to the notification discussed above. As discussed above, the automation layer 308 may provide a more detailed report to utility engineers and a more simplified version for government compliance.

Example Model of a Root Cause Identification

Figure 4:
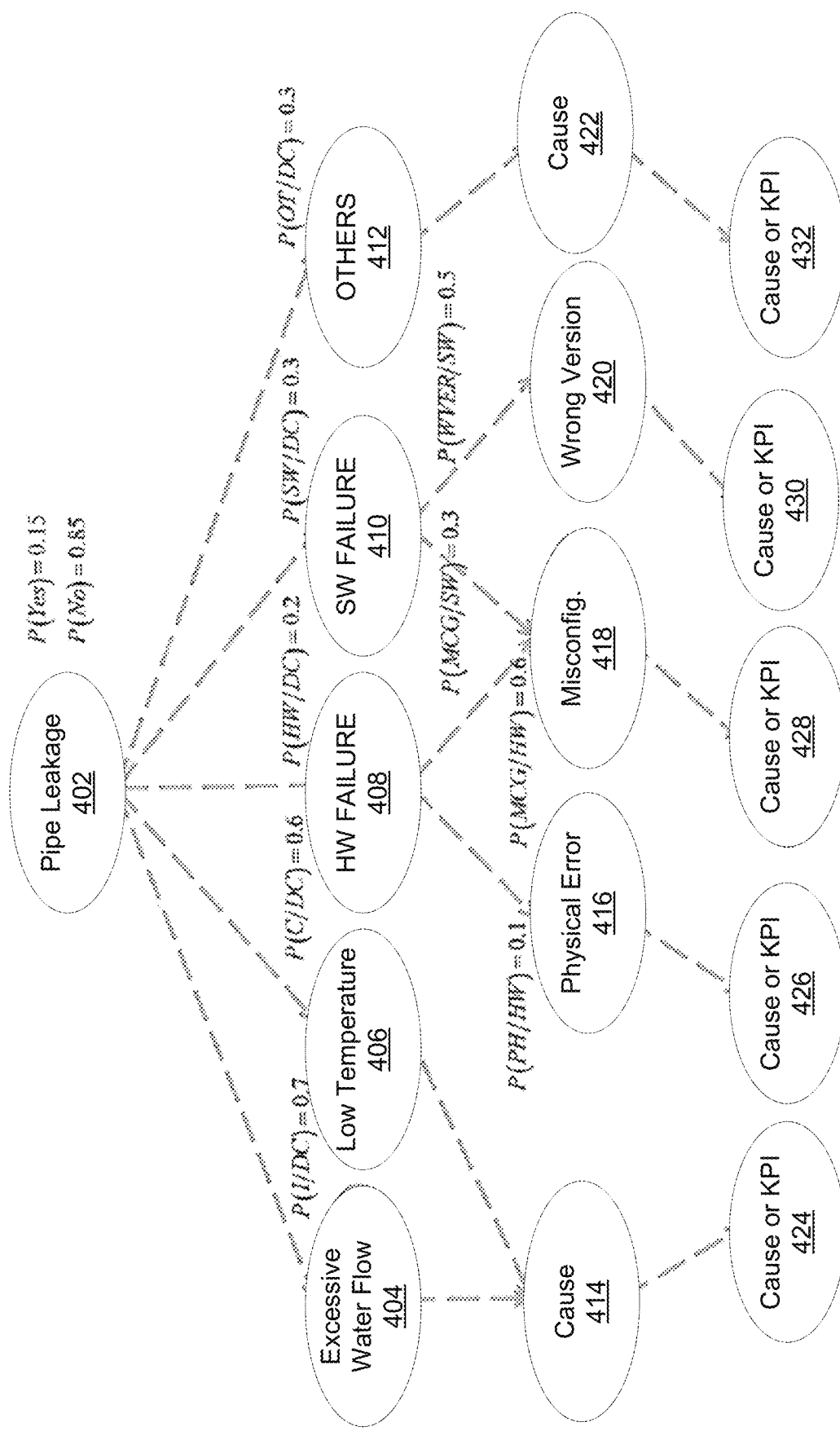
FIG. 4 illustrates an example model for a root cause identification.

FIG. 4 illustrates an example model for an automatic root cause identification of a malfunction in a utility system. Specifically, FIG. 4 illustrates a probability tree that stores information as to the probable root cause for a subsystem malfunction (i.e., pipe leakage). Based on a large corpus of data, a machine learning algorithm can determine the probabilities that an event, such as a leaky pipe, was correlated to a particular cause. In turn, a particular cause, may have different potential causes of its own, each with their own probabilities. Eventually, the probability of a root cause, may be discerned.

In FIG. 4, we start at the top of the probability tree with a pipe leakage event 402. Every event is associated with a probability P(Event). For example the probability that a detected network event could be a pipe leakage is illustrated as P(Yes)=0.15 (or 15%). The probability that the detected subsystem malfunction is some other event is P(No)=0.85.

The probability tree may then be traversed to determine the most likely root cause(s) of a subsystem malfunction. To do so, the probability tree is traversed to the probability nodules representing potential immediate causes for the pipe leakage event 402. These may include excessive water flow 404 from a subsystem before it in the industrial path, low temperature of the subsystem after it in the industrial path 406, hardware failure 408, software failure 410, or other failures 412. As with the pipe leakage event, each cause is associated with a probability. Because, these causes are potential causes, the probabilities are expressed as conditional probabilities P(Condition|Event). For example, the probability that a pipe leakage was caused by a hardware failure 408 is shown as P(HW|DC)=0.2. Similarly, the probability that a pipe leakage was caused by a software failure 410 is shown as P(SW|DC)=0.3.

Cause nodules may in turn have their own respective causes. For example, interference 404 and poor coverage/signal strength 406 may have the same cause 414. Hardware failure 408 may have different possible causes, here shown as a physical error 416 and misconfiguration of user equipment 418. Again, each nodule is associated with a respective probability, and as potential causes, each probability is expressed as a conditional probability. Here the probability that a physical error in the hardware 416 caused a hardware failure is shown as P(PH|HW)=0.1. The probability that the hardware was misconfigured 418 caused the hardware failure is shown as P(MCG|HW)=0.6.

Note that a software failure 410 may also be caused by misconfiguration 418. Even though the probability tree traverses to a nodule also traversable from hardware failure 408, the misconfiguration nodule 418 has its own probability as the cause of a software failure 410 as shown as P(MCG|SW)=0.3. A software failure 410 may also be caused by having a wrong version of software installed 420 in a subsystem of a utility, with a causal conditional probability of P(WVER|SW)=0.5. Similarly, other causes 412, may have their own respective causes 422.

A probability tree is generally populated via receiving a statistically significant corpus of data. The data is then applied to the probability tree to compute the probabilities in the probability tree.

When performing a diagnosis, the probability tree starts with the causes and/or KPI leaf nodules 424, 426, 428, 430, 432. Depending on the network data observed, the probabilities of the causes and/or KPI leaf nodules 424, 426, 428, 430, 432 are updated. For example, if a misconfiguration is actually observed, the probability of the misconfiguration 428 is changed to 100%. If a cause 424 is not observed, that probability is changed to 0%. Probabilities need not be binary, i.e. solely 100% or 0%. Intermediate (non 0% non 100%) probabilities may be computed based on a sampling or running average of data.

In one embodiment, once the causes and/or KPI leaf nodules 424, 426, 428, 430, 432 are updated, the parent nodule probabilities are updated according to Bayes Algorithm Thus the conditional probabilities of the parent nodules 414, 416, 418, 420 and 422 are updated using the child nodule as a determination as to whether a condition was satisfied. The probabilities of the parent nodules 414, 416, 418, 420 and 422 are then updated. This process is repeated for the level of parent nodules above, until the root nodule 402 is reached. At this point, all the probabilities in the probability tree have been updated in light of the observed causes and/or KPIs 424, 426, 428, 430, and 432.

Potential root causes of the root nodule, the pipe leakage 402, will be surfaced to a user by selecting all child nodules with updated probabilities exceeding a predetermined threshold.

After finishing analysis, the probability tree is returned to its original state and original probabilities.

However, over time, historical data may be collected. Upon agreement by an administrator, at least a subset of the historical data may be applied to the probability tree to permanently update the probabilities in the probability tree. Subsequent analyses may then use the updated probability tree. In this way, the probability tree learns from historical data.

It is to be emphasized that this particular approach in machine learning is but one option. Other well-known options include entropy based trees and naïve-Bayesian trees. One advantage to a Bayesian based tree is that the domain of causes and/or KPIs may be partitioned into sub-domains without forcing re-computation of the probabilities. Accordingly, a probability tree may be partitioned for different subsets of the network as desired by the administrator.

Example Process

Figure 5:
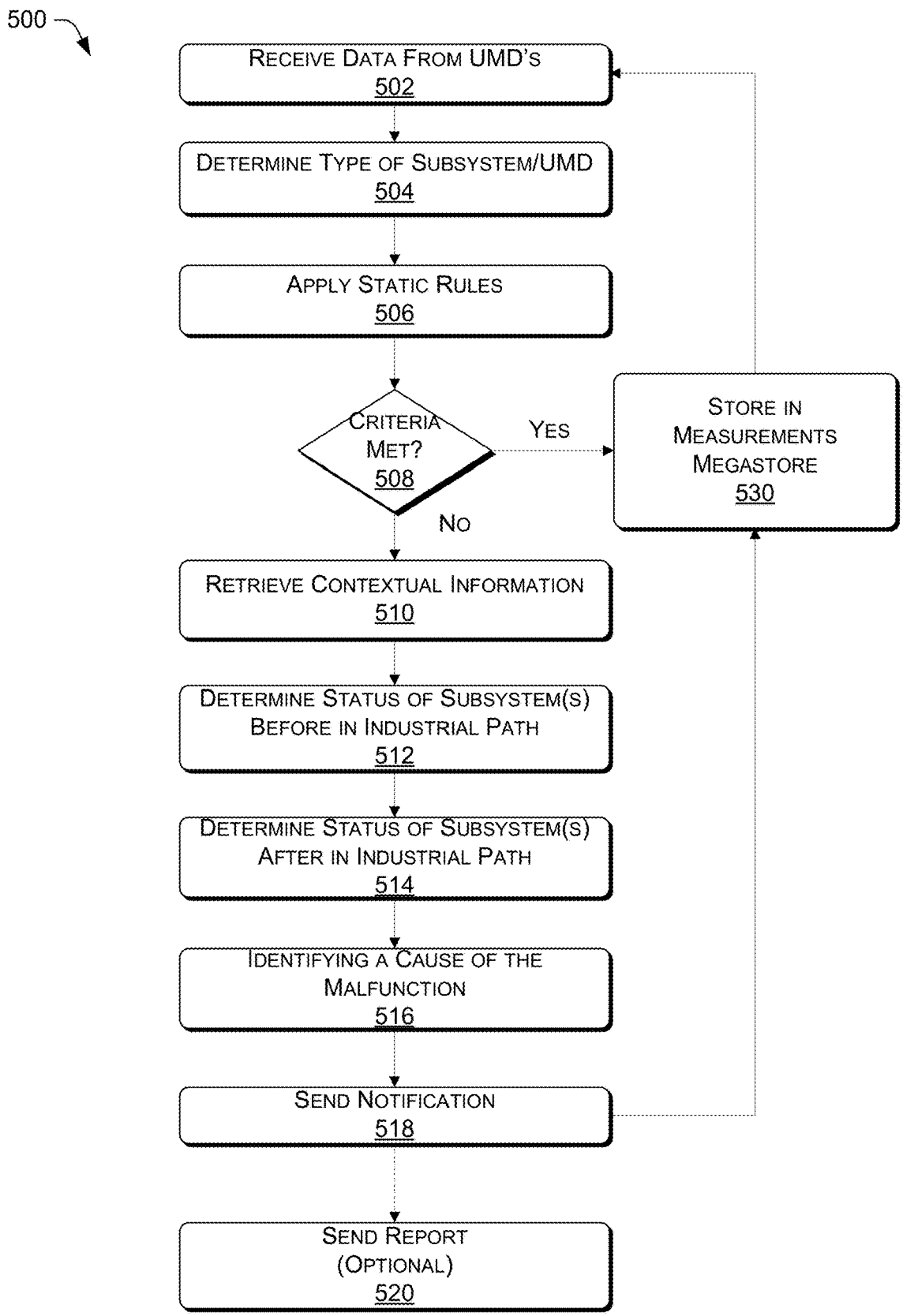
FIG. 5 is a flow diagram of an example process for the management of a utility system.

With the foregoing overview of the utility system, it may be helpful now to consider a high-level discussion of an example process. To that end, FIG. 5 illustrates a high level process for a management of a utility system. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the architecture 300 of FIG. 3. Further, for purposes of a representative example, it is assumed that the system relates to a water treatment plant, although it will be understood that other utility systems are supported as well.

At block 502, data is received from various UMD's by the data processing layer of the utility management server 340. In one embodiment, the UMD's are disparate in that they are of different type. Each UMD is configured to provide performance measurement data of its corresponding subsystem (which is part of an overall utility system (e.g., 102)). In various embodiments, the data may be received in real time, in batch at predetermined intervals, or upon request from the utility management server 302.

The type of data received may include, but is not limited to, utility equipment quality parameters, such as moisture, humidity, pressure, flow, temperature, vibration, movement, voltage, current, sound, viscosity, salinity, alkalinity, per hydrogen (pH), general hardness (gH), carbohydrate hardness (kH), radioactivity, oxygen content, etc.

In addition, the data from each UMD may include a time stamp and identification information of the UMD, such as the identification number of the UMD, the type of subsystem, as well as the software version. This data may be received by a processing layer 304 of the utility management server 302, which is capable of accommodating millions of UMD's.

In one embodiment, the processing layer 304 of the utility management server 302 performs an integrity test to determine whether the data received from each UMD is valid. Data that is deemed to be not reliable is discarded. The remaining data is stored in the measurements megastore 340. Whether the data is reliable or not is based on threshold criteria that are different for different types of UMD's and their corresponding subsystems. For example, data that is exhibiting an unusual pattern, such as an oscillation or being stuck at the same value, may indicate that the UMD itself is malfunctioning, rendering the data provided therefrom unreliable.

At block 504, the intelligence layer determines the type of UMD and its corresponding subsystem. In one embodiment, the raw performance measurement data from each subsystem/UMD combination is stored in the measurements megastore 340. The intelligence layer 306 of the utility management server 340 may determine the type of subsystem and the corresponding UMD from the identification information in the data received from each UMD. To facilitate the present discussion, a single subsystem with a corresponding UMD, referred to herein as UMD 310(2), will be used by way of example, while it will be understood that other subsystem/UMD combinations are supported as well.

At block 506, static rules are applied to the data received from UMD 310(2). The static rules may be different for each combination of subsystem/UMD. In the example of process 500, it will be assumed that UMD 310(2) relates to a subsystem comprising a fluid carrying pipe.

At block 508, the intelligence layer 306 of the utility management server 340 determines whether criteria based on the static rules are met. For example, it may be determined whether the pressure, flow rate, temperature, vibrations, etc., are within predetermined thresholds. If the criteria are met, ("yes" at decision block 408), the subsystem is deemed to be functioning properly, and the conclusion is stored in the measurements megastore 340 (i.e., step 530). This stored information may later be provided as part of the contextual information to the utility management server 302 upon request.

However, if the one or more criteria are not met, ("no" at decision block 508,) the process continues with block 510.

At block 510, contextual information related to the subsystem of UMD 310(2) is retrieved from the measurements megastore 340. In various embodiments, the utility management server 302 may retrieve contextual information from the measurements megastore 340 that includes at least one of the following: (i) historical information of the UMD 310(2) of the subject subsystem, (ii) performance measurement information of one or more subsystems connected in the industrial path before the UMD of the subject subsystem, (iii) performance measurement information of one or more subsystems connected in the industrial path after the UMD of the subject subsystem, (iv) performance measurement information from similar UMD's that monitor a similar subsystem within the present utility system, (v) performance measurement information from similar UMD's that monitor a similar subsystem within one or more other utility systems, (vi) stored WEB information of relevant events (e.g., natural events such as weather or scheduled events) that may affect the veracity of the UMD 310(2) data and the contextual information provided by the measurements megastore 340. Based on the contextual information from the measurements megastore 340, the intelligence layer 306 of the utility management server 302 may develop complex rules based at least in part on the contextual information retrieved from the measurements megastore 340.

To that end, at block 512, the intelligence layer 306 determines whether one or more subsystems before the industrial path of the subsystem of UMD 310(2) are functioning properly. Similarly, at block 514, the intelligence layer 306 determines whether one or more subsystems after the industrial path of the subsystem of UMD 310(2) are functioning properly. In various embodiments, the determination of the performance of the other subsystems may be based on the latest measurements provided by the respective UMD's or historical trends thereof.

At block 516, the intelligence layer 306 identifies the cause of the malfunction of UMD 310(2). For example, the intelligence layer 306 of the utility management server 302 may analyze the present and/or historic performance of the subsystem of UMD 310(2) to develop historical patterns and trends and extrapolate therefrom. The intelligence layer 306 of the utility management server 302 may determine whether one or more subsystems in the industrial path of the subsystem of UMD 310(2) may be the actual or contributing source of the malfunction.

At block 518, upon determining by the intelligence layer 306 the one or more sources of the malfunction and corrective action therefor, a notification is sent by an automation layer 308 to an appropriate recipient. In various scenarios, the appropriate recipient may be UMD 310(2) itself, one or more UMD's before in the industrial path of the subsystem of UMD 310(2) (e.g., UMD 310(1)), one or more UMD's after in the industrial path of the subsystem of UMD 310(2) (e.g., 310(3)), or an appropriately skilled engineer associated with the utility system.

In various embodiments, the notification may be sent via text message, e-mail, telephone, social media, etc. The notification may be an alert that is provided on a user interface of the UMD or on a computing device (e.g., display, LED, speaker, haptic element etc.,) of an appropriate recipient, and/or may include instructions for corrective action such that the respective one or more UMD's can automatically cure the malfunction of their subsystem (e.g., through one or more actuators described before). Accordingly, the notification may include instructions that are used by the recipient UMD(s) to make one or more adjustments to their subsystem. The identified status of the subsystems may be stored in the measurements megastore 340.

In one embodiment, at block 520, the automation layer 308 of the utility management server 302 may optionally prepare and send an automated summary report of the utility system to one or more appropriate recipients to provide status information on the utility system and/or to comply with regulatory requirements. To that end, automated reports can be generated at predetermined intervals (e.g., daily, monthly, etc.), when a threshold condition is met (e.g., emergency), and/or upon request from an authorized entity, such as a local municipality, state government, emergency management department, utility plant manager, utility engineer, etc.

Example Computer Platform

As shown by the above discussion, functions for storing contextual information, monitoring subsystems of a utility system, determining a root case of a subsystem malfunction, providing notifications, providing summary reports, and other functions, can be implemented on computers connected for data communication via packet network 120, operating as the utility management server 140, measurements megastore 142, various UMD's, and components of the radio access network 122, as shown in FIG. 1. Although special purpose devices may be used, such devices also may be implemented using one or more hardware platforms intended to represent a general class of data processing device commonly used to run "server" programming so as to implement functions such as receiving data from various UMD's, retrieving contextual information, analyzing information for determining whether a predetermined condition is met or a predetermined threshold is exceeded, and providing notifications and/or reports, as discussed above, albeit with an appropriate network connection for data communication.

Figure 6:
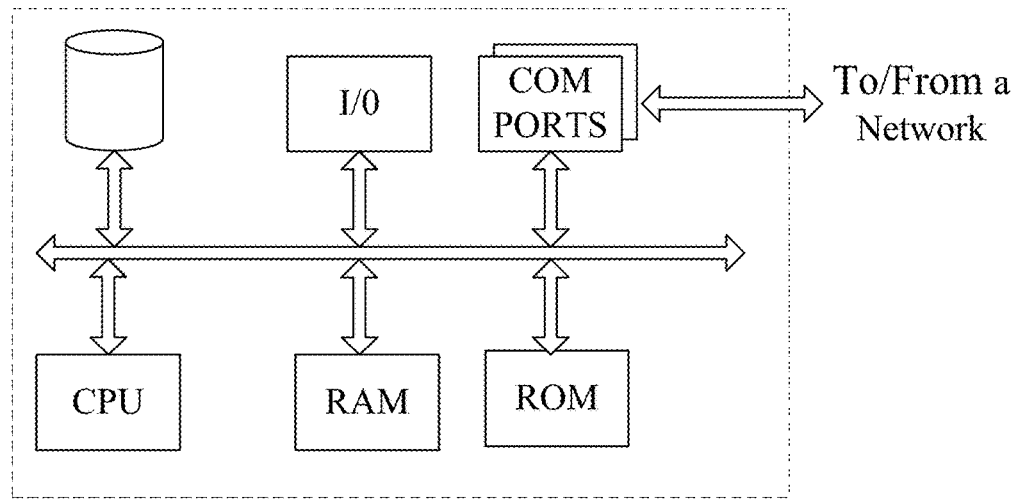
FIG. 6 illustrates a network or host computer.
Figure 7:
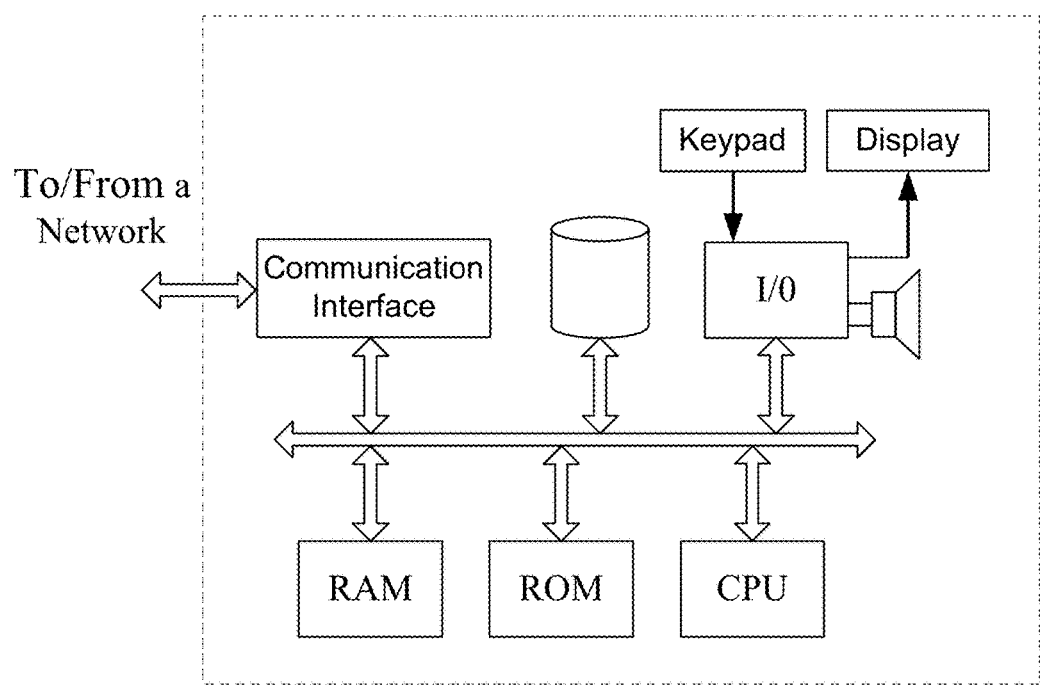
FIG. 7 illustrates a computer with user interface elements.

FIGS. 6 and 7 provide functional block diagram illustrations of general purpose computer hardware platforms. FIG. 6 illustrates a network or host computer platform, as may typically be used to implement a server. FIG. 7 depicts a device with user interface elements, as may be used to implement a personal computer, such as computer 128 of FIG. 1 or a workstation, or to implement a computing device, such as a UMD's 104(1) to 104(N) and 108(1) to 108(N), although the device of FIG. 7 may also act as a server if appropriately programmed. It is believed that the general structure and general operation of such equipment as shown in FIGS. 6 and 7 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. As used herein, the computer system of FIG. 6 may use a massive parallel processing technology such as Hadoop, Storm, or Spark. Of course, the server functions may be implemented in a distributed fashion on a number of similar platforms, to distribute the processing load. In various other embodiments, the functionality of the utility management server 140 and measurements megastore 142, may be combined in one or more server platforms.

The software functionalities involve programming, including executable code as well as associated stored data, e.g., files used for applications on the utility management server 140 to receive data from various UMD's by the processing layer, retrieving contextual information from the measurements megastore 142, analyzing the data from the various UMD's and the contextual information, identifying a source of the malfunction, and providing notifications that may automatically cure the malfunction. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of retrieving information, analyzing the information, providing notifications, etc., in essentially the manner performed in the implementations discussed and illustrated herein.

Hence, aspects of the methods of receiving and processing node data as outlined above may be embodied in programming Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

While some examples herein relate to a water treatment utility, it will be understood that the concepts discussed herein are applicable in other utility systems, such as electric power, coal, gas, oil, etc.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A utility management server comprising:
a processor;
a network interface coupled to the processor configured to enable communications via a communication network;
a storage device for storing content and programming; and
a program stored in the storage device having a processing layer, an intelligence layer, and an automation layer, wherein execution of the program by the processor configures the utility management server to perform acts comprising:
receiving, by the processing layer, performance measurement data of a subsystem of a first utility system, from a first utility monitoring device (UMD);
determining, by the intelligence layer from identification information included in the performance measurement data or from correlating information included in the performance measurement data with other data sources such as equipment inventory databases, a type of the subsystem and a type of the first UMD;
applying static rules to the performance measurement data, by the intelligence layer, based on the type of subsystem and the type of the UMD;
upon determining, by the intelligence layer, that a predetermined condition based on the static rules is met, storing the performance measurement data of the first UMD in a measurements megastore server;
upon determining, by the intelligence layer, that the predetermined condition based on the static rules is not met, identifying, by the intelligence layer, a subsystem and its corresponding UMD responsible for a malfunction, by:
retrieving a contextual information related to the subsystem of the first UMD from the measurements megastore server;
analyzing the data from the first UMD and the contextual information by the intelligence layer; and
sending a notification to the UMD having the subsystem that has been identified as being the source of the malfunction, the notification including information operative to adjust one or more parameters of each subsystem having an UMD that receives the notification to cure the malfunction.

2. The utility management server of claim 1, wherein the contextual information from the measurements megastore server comprises a historical information of the subsystem of the first UMD.

3. The utility management server of claim 2, wherein the contextual information from the measurements megastore server further comprises at least one of:
performance measurement information of one or more subsystems connected in the industrial path before the subsystem of the first UMD; and
performance measurement information of one or more subsystems connected in the industrial path after the subsystem of the first UMD.

4. The utility management server of claim 2, wherein the contextual information from the measurements megastore server further comprises performance measurement information from another subsystem and a corresponding UMD of a same type as the first UMD and its subsystem, in the first utility system.

5. The utility management server of claim 2, wherein the contextual information from the measurements megastore server further comprises performance measurement information from another subsystem and a corresponding UMD of the same type as the first UMD and its subsystem, from another utility system.

6. The utility management server of claim 1, wherein the notification is sent to one or more of the other UMDs that are of the same type and having a same type of subsystem.

7. The utility management server of claim 1, wherein the analyzing by the intelligence layer includes at least one of determining (i) patterns and (ii) trends based on the performance measurement data of the subsystem of the first utility system and the contextual information.

8. The utility management server of claim 1, wherein:
the first UMD comprises at least one sensor and at least one actuator;
the at least one sensor is configured to determine a status of the subsystem, and
the actuator is configured to adjust one or more parameters of the subsystem upon the first UMD receiving the notification.

9. The utility management server of claim 1, wherein execution of the program further configures the utility management server to perform acts comprising:
preparing, by the automation layer, a summary report of a performance of the first utility system; and
sending the summary report to a government body to comply with a regulatory requirement.

10. The utility management server of claim 1, wherein the contextual information is provided to the utility management server via a query performed by the utility management server to the measurements megastore server via an open application program interface (API).

11. The utility management server of claim 1, wherein execution of the program further configures the utility management server to perform acts comprising:

receiving, by the processing layer, performance measurement data of a plurality of other subsystems, each of the plurality of other subsystems having a corresponding UMD, wherein:
  at least one of the plurality of other subsystems is of a different type from the subsystem of the first UMD, and
  the performance measurement data of each of the plurality of other systems is received in parallel together with the performance measurement data from the first UMD, in real time.

12. The utility management server of claim 1, wherein execution of the program further configures the utility management server to perform acts comprising:
  receiving, by the processing layer, performance measurement data of a plurality of other subsystem, each of the plurality of other subsystems having a corresponding UMD, wherein the performance measurement data of one or more subsystems is received in batch at predetermined intervals or upon a request from the utility management server.

13. The utility management server of claim 1, wherein one or more of the subsystems of the plurality of subsystems is from another utility system.

14. The utility management server of claim 1, wherein execution of the program further configures the utility management server to perform acts comprising:
  upon identifying, by the intelligence layer, the source of the malfunction, sending a notification to an engineer of the utility who is responsible for the subsystem that has been identified as the source of the malfunction.

15. The utility management server of claim 1, wherein the measurements megastore server uses massive parallel processing technology of at least one of: (i) Hadoop, (ii) Storm, and (iii) Spark.

16. The utility management server of claim 1, wherein execution of the program further configures the utility management server to perform acts comprising:
  machine learning via one or more models performed on a pre-determined training set by the intelligence layer and operative to identify patterns and trends in the subsystem performance measurement data from the first UMD and the contextual information from the measurements megastore server.

17. A non-transitory computer-readable medium having stored thereon a plurality of sequences of instructions which, when executed by one or more processors cause an electronic device to:
  receive performance measurement data from a plurality of utility monitoring devices (UMDs) of a subsystem of a utility system;
  determining, using identification information included in the performance measurement data or in associated metadata, a type of the subsystem and respective types of the UMDs;
  retrieving contextual information from a measurements megastore server related to the subsystem;
  clustering the performance measurement data according to the retrieved contextual information by applying static rules to the performance measurement data based on the type of the subsystem and the respective types of the UMDs;
  analyzing the performance measurement data and identifying a malfunction attributed to a predetermined threshold number of performance measurements in a cluster;
  attributing the identified malfunction to another performance measurement in the same cluster, wherein the identified malfunction had not been previously attributed to the other performance measurement in the same cluster;
  identifying another subsystem associated with the other performance measurement as the source of the identified malfunction; and
  sending a notification to the UMD having the other subsystem that has been identified as the source of the malfunction, the notification including information operative to adjust one or more parameters of each subsystem having an UMD that receives the notification to cure the malfunction.

18. The non-transitory computer-readable medium of claim 17, wherein the utility system is a water utility, the contextual information includes water usage of water utility customers, and the performance measurement data clusters are based at least on the water usage of water utility customers.

19. The non-transitory computer-readable medium of claim 17, wherein the plurality of sequences of instructions further include:
  identifying a pattern via analyzing the identified malfunctions using root cause analysis; and
  reporting a root cause common to the identified malfunctions.

20. The utility management server of claim 1, wherein execution of the program by the processor configures the utility management server to perform acts comprising:
  performing an integrity test on the performance measurement data; and
  in response to the integrity test indicating that the performance measurement data is not reliable, discarding the performance measurement data.

* * * * *